(12) United States Patent
Toda et al.

(10) Patent No.: US 9,039,965 B2
(45) Date of Patent: May 26, 2015

(54) COPPER-BASED SLIDE MEMBER

(71) Applicant: DAIDO METAL COMPANY LTD., Nagoya (JP)

(72) Inventors: Kazuaki Toda, Inuyama (JP); Satoru Kurimoto, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 311 days.

(21) Appl. No.: 13/633,168

(22) Filed: Oct. 2, 2012

(65) Prior Publication Data

US 2013/0089459 A1 Apr. 11, 2013

(30) Foreign Application Priority Data

Oct. 6, 2011 (JP) ................................. 2011-222373

(51) Int. Cl.
| | | |
|---|---|---|
| *C22C 9/00* | (2006.01) | |
| *C22C 9/04* | (2006.01) | |
| *C22C 9/05* | (2006.01) | |
| *C22C 9/10* | (2006.01) | |
| *F16C 33/12* | (2006.01) | |

(52) U.S. Cl.
CPC ...... *C22C 9/04* (2013.01); *C22C 9/05* (2013.01); *C22C 9/00* (2013.01); *C22C 9/10* (2013.01); *F16C 33/121* (2013.01); *F16C 2360/24* (2013.01); *F16C 2360/22* (2013.01); *F16C 2204/14* (2013.01)

(58) Field of Classification Search
None
See application file for complete search history.

(56) References Cited

U.S. PATENT DOCUMENTS

| | | | | |
|---|---|---|---|---|
| 2,145,065 A | * | 1/1939 | Vaders ......................... | 148/434 |
| 3,337,335 A | * | 8/1967 | Fearnside .................... | 148/413 |
| 4,676,848 A | * | 6/1987 | Ruchel et al. ................ | 148/434 |
| 4,851,191 A | * | 7/1989 | Lee et al. ..................... | 420/471 |
| 5,282,908 A | | 2/1994 | Nakashima et al. | |
| 5,288,683 A | * | 2/1994 | Nakashima et al. .......... | 148/413 |
| 5,296,057 A | * | 3/1994 | Baba et al. ................... | 148/436 |
| 6,790,297 B1 | * | 9/2004 | Ueda et al. ................... | 148/432 |
| 2003/0026715 A1 | | 2/2003 | Ojima et al. | |
| 2007/0266808 A1 | * | 11/2007 | Kanemitsu et al. ............ | 74/60 |

(Continued)

FOREIGN PATENT DOCUMENTS

| | | |
|---|---|---|
| GB | 2478413 | 9/2011 |
| JP | 56-127741 A | * 10/1981 |

(Continued)

OTHER PUBLICATIONS

Combined Search and Examination Report dated Jan. 31, 2013 in corresponding Patent Application No. GB121795.1 (three pages).

(Continued)

*Primary Examiner* — Kiley Stoner
(74) *Attorney, Agent, or Firm* — Harness, Dickey & Pierce, P.L.C.

(57) ABSTRACT

In a copper-based slide member in which needle-shaped Mn—Si based compounds are dispersed in a brass structure, 50% or more of a total number of the needle-shaped Mn—Si based compounds having lengths of 50 μm or more in a major axis direction are constituted of a plurality of small particles. Thereby, even if the needle-shaped Mn—Si based compounds fall off during sliding, the small particles which constitute the needle-shaped Mn—Si based compounds may fall off. Thus, the frequency of falling off of the coarse needle-shaped Mn—Si based compound which damages a shaft and a bearing is decreased. Therefore, seizure hardly occurs.

7 Claims, 2 Drawing Sheets

(56) References Cited

U.S. PATENT DOCUMENTS

2011/0211781 A1    9/2011  Toda et al.
2012/0251383 A1*  10/2012  Toda et al. .................... 420/482
2013/0058605 A1*   3/2013  Hirayama et al. ............ 384/397

FOREIGN PATENT DOCUMENTS

| | | | |
|---|---|---|---|
| JP | 57-076143 A | * | 5/1982 |
| JP | H09316570 A | | 12/1997 |
| JP | 2003-042125 | | 2/2003 |
| JP | 2006-161801 A | * | 6/2006 |

OTHER PUBLICATIONS

Office Action dated Apr. 3, 2014 in corresponding Chinese Patent Application No. 201210375447.8 (7 pages).

* cited by examiner

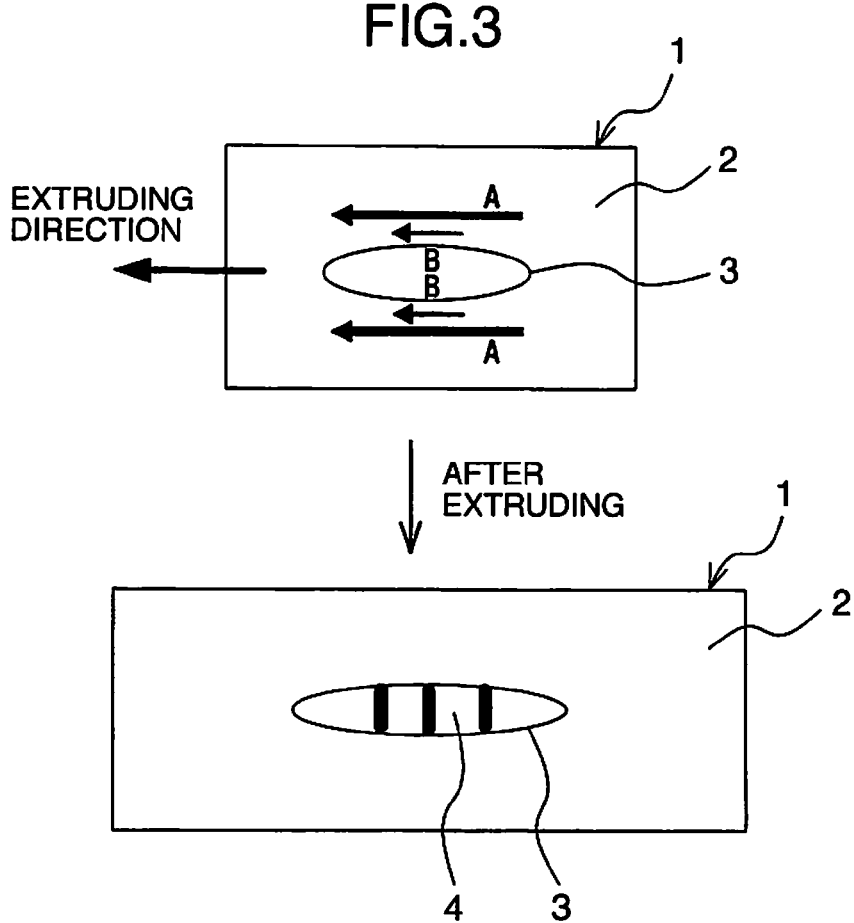
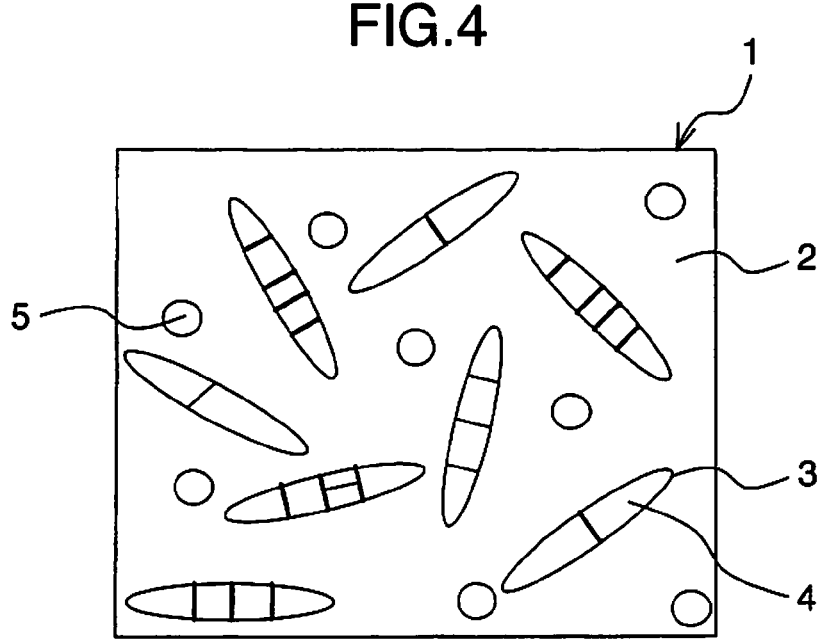

COPPER-BASED SLIDE MEMBER

INCORPORATION BY REFERENCE

The present application claims priority from JP Patent Application Ser. No. 2011-222373 filed on Oct. 6, 2011, the content of which is hereby incorporated by reference into this application.

BACKGROUND OF THE INVENTION (1) Field of the Invention

The present invention relates to a copper-based slide member that is excellent in seizure resistance and suitable for a turbocharger of an internal combustion engine.

(2) Description of Related Art

Conventionally, corrosion resistance and wear resistance have been required of radial bearings applied to turbochargers of internal combustion engines. A copper alloy which contains Cu, Zn, Al, and Mn—Si based compounds as main compositions is used as a material for radial bearings, as is shown in JP-A-2003-42145. In the art disclosed in JP-A-2003-42145, crystallized type Mn—Si based compounds which are crystallized in needle shapes in a brass matrix (hereinafter, referred to as "needle-shaped Mn—Si based compounds") extend and disperse in an axial direction of a rotational axis. Thereby, the effect of improving the wear resistance of the radial bearing can be obtained.

BRIEF SUMMARY OF THE INVENTION

However, even when the needle-shaped Mn—Si based compounds extend and disperse in the axial direction of the rotational axis as in the art disclosed in JP-A-2003-42145, if a needle-shaped Mn—Si based compound is present, which is excessively large for the size (length in the major axis direction) of the particle of the needle-shaped Mn—Si based compound, there arises the fear that when the needle-shaped Mn—Si based compound falls off from the sliding surface during sliding, the needle-shaped Mn—Si based compound hurts the bearing surface and the shaft surface, and finally causes seizure, although the wear resistance is enhanced. Meanwhile, if the sizes (lengths in the major axis direction) of all the particles of the needle-shaped Mn—Si based compounds are too small, sufficient wear resistance cannot be ensured.

The present invention is made in the light of the circumstances described above. It is an object of the present invention to provide a copper-based slide member having excellent seizure resistance by controlling a dispersion state of the needle-shaped Mn—Si based compounds which are crystallized in a brass structure.

In order to attain the above-described object, one embodiment of the present invention is characterized in that, in a copper-based slide member constituted of a brass in which Mn—Si based compounds are dispersed in a brass structure, the Mn—Si based compounds contain particles of needle-shaped Mn—Si based compounds having lengths of 50 µm or more in a major axis direction, and 50% or more of a total number of the needle-shaped Mn—Si based compounds are constituted of a plurality of small particles.

Another embodiment of the present invention is characterized in that, in the copper-based slide member, all of the needle-shaped Mn—Si based compounds having the lengths of 50 µm or more in the major axis direction in the copper-based slide member are constituted of a plurality of small particles.

Another embodiment of the present invention is characterized in that, in the copper-based slide member, in 70% or more of the total number of the small particles which constitute the needle-shaped Mn—Si based compounds having the lengths of 50 µm or more in the major axis direction in the copper-based slide member, the lengths of the small particles are 45 µm or less with respect to the major axis direction of the needle-shaped Mn—Si based compounds having the lengths of 50 µm or more in the major axis direction.

Another embodiment of the present invention is characterized in that, in the copper-based slide member, the copper-based slide member contains 3 volume % to 50 volume % of the needle-shaped Mn—Si based compounds having the lengths of 50 µm or more in the major axis direction.

Another embodiment of the present invention is characterized in that, in the copper-based slide member, the copper-based slide member is constituted of 20 mass % to 45 mass % of Zn, 0.3 mass % to 2.0 mass % of Si, and 1.0 mass % to 6.0 mass % of Mn, the balance being Cu and inevitable impurities.

Another embodiment of the present invention is characterized in that, in the copper-based slide member, the copper-based slide member further contains 0.1 mass % to 5 mass % in total of at least one element selected from the group consisting of Fe, Al, Ni, Sn, Cr, Ti, Mo, Co, Zr and Sb.

Another embodiment of the present invention is characterized in that, in the copper-based slide member, the copper-based slide member further contains 0.1 mass % to 5 mass % in total of at least one element selected from the group consisting of Pb and Bi.

BRIEF DESCRIPTION OF THE SEVERAL VIEWS OF THE DRAWING

FIG. 3 is a view for explaining formation of a plurality of small particles by segmentation of the needle-shaped Mn—Si based compound at a time of extruding of a copper-based slide member; and FIG. 4 is a schematic view showing a copper-based slide member in which all the needle-shaped Mn—Si based compounds crystallized in a brass structure are constituted of a plurality of small particles.

DETAILED DESCRIPTION OF THE INVENTION

In one embodiment of the present invention, needle-shaped Mn—Si based compounds are dispersed as the Mn—Si based compounds in a brass structure. The needle-shaped Mn—Si based compounds are the compounds which contribute to improvement of wear resistance. In particular, if the length in the major axis direction of the needle-shaped Mn—Si based compound is 50 µm or more, the effect of improving the wear resistance can be obtained. The needle-shaped Mn—Si based compounds are formed by Mn and Si being crystallized in the brass structure in the form of needle-shaped particles at the time of casting.

Further, in one embodiment of the present invention, the needle-shaped Mn—Si based compounds are constituted of a plurality of small particles. The plurality of small particles are formed by segmenting the needle-shaped Mn—Si based compounds by subjecting the copper-based slide member in which the needle-shaped Mn—Si based compounds are dispersed to plastic working at a controlled working ratio.

Figure 1:
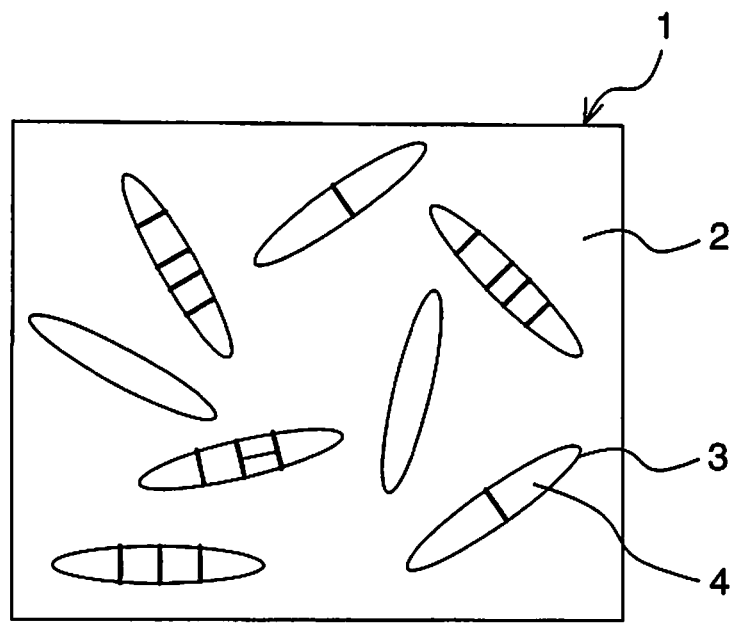
FIG. 1 is a schematic view showing a copper-based slide member in which needle-shaped Mn—Si based compounds having lengths of 50 µm or more in a major axis direction which are crystallized in a brass structure are constituted of a plurality of small particles.
Figure 2:
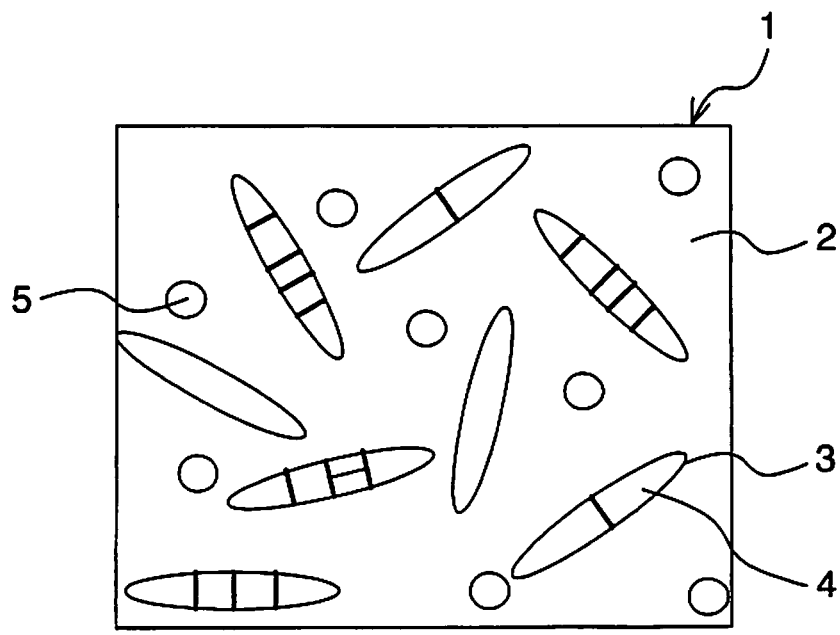
FIG. 2 is a schematic view showing a copper-based slide member in which Mn—Si based compounds having the lengths of less than 50 µm in the major axis direction are contained in a brass structure.

In one embodiment of the present invention, as shown in FIG. 1, in a copper-based slide member 1 in which needle-shaped Mn—Si based compounds 3 are dispersed in a brass structure 2, 50% or more of a total number of the needle-shaped Mn—Si based compounds 3 having lengths of 50 μm or more in a major axis direction are constituted of a plurality of small particles 4. Thereby, even if the needle-shaped Mn—Si based compounds 3 fall off during sliding, the small particles 4 which constitute the needle-shaped Mn—Si based compounds 3 may fall off. Thus, the frequency of falling off of the coarse needle-shaped Mn—Si based compound 3 which damages a shaft and a bearing is decreased. Therefore, seizure hardly occurs. Further, in the copper-based slide member 1 in which the needle-shaped Mn—Si based compounds 3 are dispersed in the brass structure 2, even if not only the needle-shaped Mn—Si based compounds 3 having the lengths of 50 μm or more in the major axis direction, but also the Mn—Si based compounds 5 having the lengths of less than 50 μm in the major axis direction are contained as shown in FIG. 2, the Mn—Si based compounds 5 having the lengths of less than 50 μm in the major axis direction do not become harmful foreign matters when falling off during sliding, and therefore, have no influence on the seizure resistance.

Further, a clearance among the small particles which constitute the needle-shaped Mn—Si based compounds is desirably 5 μm or less. When the surface distance between the small particles is 5 μm or less, the small particles do not easily fall off during sliding, and the form of the needle-shaped Mn—Si based compound can be kept for a long time. Further, when the copper-based slide member in which the needle-shaped Mn—Si based compounds are dispersed is subjected to plastic working, the needle-shaped Mn—Si based compounds are mainly segmented in the perpendicular direction to the major axis direction. However, it is also allowed that the needle-shaped Mn—Si based compounds are segmented in the parallel direction to the major axis direction.

Further, it is confirmed by an experiment that when the copper-based slide member in which the needle-shaped Mn—Si based compounds are dispersed is used as a bearing, if the forms of the needle-shaped Mn—Si based compounds of the present invention are configured at least in the region within a depth of 100 μm from the bearing surface, the same effect as described above can be obtained.

Further, a control method of the dispersion state of the needle-shaped Mn—Si based compounds which are crystallized in the brass structure will be described. As for the size of the needle-shaped Mn—Si based compound, the length in the major axis direction can be made 50 μm or more by the conditions at the time of casting. After casting, when the billet is subjected to extruding into bar stock in a predetermined shape by controlling the working ratio, the needle-shaped Mn—Si based compounds can be segmented into a plurality of small particles. This is because a plastic deformation amount B of the needle-shaped Mn—Si based compounds 3 is small compared to a plastic deformation amount A of the brass structure 2 at the time of extruding of the copper-based slide member in which the needle-shaped Mn—Si based compounds 3 are dispersed in the brass structure 2, as shown in FIG. 3. However, the Mn—Si based compounds having the major axis lengths of less than 50 μm which are dispersed in the copper-based slide member may or may not be segmented.

Further, as long as a working method, such as drawing and forging, is used which causes plastic deformation to the inside of the casting, the form of the needle-shaped Mn—Si based compound of the present invention can be made by controlling the working ratio thereof. Therefore, the working method is not limited to extruding.

In another embodiment of the present invention, all of the needle-shaped Mn—Si based compounds having the lengths of 50 μm or more in the major axis direction are constituted of a plurality of small particles, in the copper-based slide member 1 in which the needle-shaped Mn—Si based compounds 3 are dispersed in the brass structure 2, as shown in FIG. 4. Thereby, even if the needle-shaped Mn—Si based compounds 3 fall off during sliding, seizure more hardly occurs. This is because the needle-shaped Mn—Si based compounds 3 having the lengths of 50 μm or more in the major axis direction which are not constituted of a plurality of small particles 4 are not contained, and the frequency of falling off of the coarse needle-shaped Mn—Si based compound 3 which damages the shaft and the bearing is decreased more.

In another embodiment of the present invention, in 70% or more of the total number of the small particles which constitute the needle-shaped Mn—Si based compounds having the length of 50 μm or more in the major axis direction, the lengths of the small particles are 45 μm or less with respect to the major axis direction of the needle-shaped Mn—Si based compounds having the lengths of 50 μm or more in the major axis direction, in the copper-based slide member in which the needle-shaped Mn—Si based compounds are dispersed in the brass structure. Thereby, even if the needle-shaped Mn—Si based compounds fall off during sliding, seizure more hardly occurs. This is because the small particles having the lengths of 45 μm or less with respect to the major axis direction of the needle-shaped Mn—Si based compounds may fall off, and the frequency of falling off of the coarse needle-shaped Mn—Si based compounds which damage the shaft and the bearing is more decreased.

In another embodiment of the present invention, in the copper-based slide member in which the needle-shaped Mn—Si based compounds are dispersed in the brass structure, 3 volume % to 50 volume % of the needle-shaped Mn—Si based compounds having the lengths of 50 μm or more in the major axis direction are contained. Thereby, favorable wear resistance is obtained. When the needle-shaped Mn—Si based compounds having the lengths of 50 μm or more in the major axis direction exceeds 50 volume %, this causes a state that the needle-shaped Mn—Si based compounds are excessively crystallized in the brass structure, and the material becomes too hard. Meanwhile, if the needle-shaped Mn—Si based compounds having the lengths of 50 μm or more in the major axis direction account for less than 3 volume %, the effect of improving the wear resistance is not sufficient.

In another embodiment of the present invention, the copper-based slide member is constituted of 20 mass % to 45 mass % of Zn, 0.3 mass % to 2.0 mass % of Si, and 1.0 mass % to 6.0 mass % of Mn, the balance being Cu and inevitable impurities. Zn is the element which contributes to corrosion resistance, and 20 to 45 mass % of Zn is contained. With less than 20 mass % of Zn, the corrosion resistance under a high temperature environment is not sufficient. When Zn exceeds 45 mass %, the material becomes too hard. The content of Zn is more preferably in a range of 28 to 40 mass %.

Si is the element which reacts with Mn, and forms an Mn—Si based compound which contributes to improvement of sliding property, and 0.3 to 2.0 mass % of Si is contained. With less than 0.3 mass % of Si, the formation amount of the Mn—Si based compounds is small, and the effect of improving the sliding property is insufficient. When Si exceeds 2.0 mass %, the material becomes too hard. The content of Si is more preferably in a range of 0.6 to 1.2 mass %.

Mn is the element which reacts with Si, and forms the Mn—Si based compound which contributes to sliding property, and 1.0 to 6.0 mass % of Mn is contained. With less than 1.0 mass % of Mn, the formation amount of the Mn—Si based compounds is small, and therefore, the effect of improving the sliding property becomes insufficient. When Mn exceeds 6.0 mass %, the material becomes too hard. The content of Mn is more preferably in a range of 2.0 to 4.0 mass %.

In another embodiment of the present invention, the copper-based slide member may further contain 0.1 mass % to 5 mass % in total of at least one element selected from the group consisting of Fe, Al, Ni, Sn, Cr, Ti, Mo, Co, Zr and Sb. These elements are the elements which contribute to reinforcement of the matrix of the copper-based slide member. With less than 0.1 mass % of the elements, the material becomes soft. When the elements exceed 5 mass %, the material becomes too hard. Further, these elements combine with Mn and Si, and sometimes form compounds. The needle-shaped Mn—Si based compounds in the present invention may be compounds formed with the above described elements.

In another embodiment of the present invention, the copper-based slide member may further contain 0.1 mass % to 5 mass % in total of at least one element selected from the group consisting of Pb and Bi. These elements are the elements which contribute to improvement of lubricity. With less than 0.1 mass % of the elements, the effect of improving lubricity is insufficient. When the elements exceed 5 mass %, the material becomes too hard.

Now, a production method of examples, which use copper-based slide members in which needle-shaped Mn—Si based compounds are dispersed according to the present embodiment, and comparative examples is explained. First, casting was performed with a predetermined chemical composition, and needle-shaped Mn—Si based compounds were crystallized in the copper-based slide member. Thereafter, extruding, drawing or forging was applied to the copper alloy casting. Further, the dispersion state of the needle-shaped Mn—Si based compounds were controlled by controlling a cooling temperature at the time of casting, and a working ratio at the time of hot working. In particular, in the examples, the castings were gradually cooled and solidified so that the lengths in the major axis direction of many needle-shaped Mn—Si based compounds grew to be 50 μm or more, and the working ratios at the time of hot working were made higher than the conventional product. Thereby, the needle-shaped Mn—Si based compounds having the lengths of 50 μm or more in the major axis direction were segmented into a plurality of small particles. Further, in the comparative examples, the castings were gradually cooled to be solidified so that the lengths in the major axis direction of many of the needle-shaped Mn—Si based compounds grew to be 50 μm or more, as in the examples, and the working ratios at the time of hot working were made low as the conventional product, so that the needle-shaped Mn—Si based compounds of the lengths of 50 μm or more in the major axis direction were not segmented into a plurality of small particles.

The dispersion states of the needle-shaped Mn—Si based compounds described above were measured by photographing the composition images of the sections seen from the direction perpendicular to the extruding direction, the drawing direction or the forging direction in the copper-based slide members with a magnifying power of 500, and by using an ordinary image analysis method from the obtained composition images (analysis software: Image-ProPlus (Version 4.5); made by Planetron Co.) or the like.

With respect to examples A and B, which used the copper-based slide members in which the needle-shaped Mn—Si based compounds were dispersed according to the present embodiment, and comparative example A, an wear test using bearing testing machine was performed. Table 1 shows the wear test conditions. Table 2 shows the chemical compositions of examples A and B and comparative example A, parameters relating to the dispersion states of the needle-shaped Mn—Si based compounds, and wear amounts. "AVERAGE OF LONG DIAMETERS OF NEEDLE-SHAPED PARTICLES" shown in Table 2 shows the average value of the maximum Feret's diameters of the needle-shaped Mn—Si based compounds having the lengths of 50 μm or more in the major axis direction. Further, "VOLUME % OF NEEDLE-SHAPED PARTICLE" shows the measurement result of measuring the area % of the needle-shaped Mn—Si based compounds having the lengths of 50 μm or more in the major axis direction with respect to the observation field of view, because the surface and the interior of the copper-based slide member have equivalent dispersion states. Further, "RATIO OF THE NUMBER OF SEGMENTED NEEDLE-SHAPED PARTICLES" shows the measurement result of measuring the ratio of the needle-shaped Mn—Si based compounds segmented into a plurality of small particles with respect to the total number of the needle-shaped Mn—Si based compounds having the lengths of 50 μm or more in the major axis direction within the observation field of view. Further, "WEAR AMOUNT" shows the value calculated from the difference in the thickness before and after the wear test by measuring the thicknesses of the test piece before and after the wear test.

TABLE 1

| TEST METHOD | BUSH TEST |
|---|---|
| BEARING INSIDE DIAMETER | 20 mm |
| PERIPHERAL SPEED | 0.1 m/s |
| TEST TIME | 8 HOURS |
| LOAD | 10 MPa |
| LUBRICATING OIL | ENGINE OIL |
| LUBRICATING OIL TEMPERATURE | 120° C. |

TABLE 2

| | MATERIAL | COMPONENTS (MASS %) | | | | | AVERAGE OF LONG DIAMETERS OF NEEDLE-SHAPED PARTICLES (μm) | VOLUME % OF NEEDLE-SHAPED PARTICLES (%) | RATIO OF THE NUMBER OF SEGMENTED NEEDLE-SHAPED PARTICLES (%) | WEAR AMOUNT (μm) |
|---|---|---|---|---|---|---|---|---|---|---|
| | | Cu | Zn | Mn | Si | OTHERS | | | | |
| EXAMPLES | A | BALANCE | 29.3 | 2.5 | 0.8 | — | 72.3 | 19.6 | 50 | 0.8 |
| | B | BALANCE | 30.9 | 2.8 | 0.9 | — | 79.9 | 21.3 | 89 | 0.7 |
| COMPARATIVE EXAMPLE | A | BALANCE | 30.5 | 3.1 | 0.7 | — | 75.5 | 20.2 | 0 | 0.7 |

In each of examples A and B and comparative example A, the lengths in the major axis direction of the needle-shaped Mn—Si based compounds are 50 μm or more, and 3 to 50 volume % of the needle-shaped Mn—Si based compounds having the lengths of 50 μm or more in the major axis direction is contained in the copper-based slide member. In each of examples A and B, 50% or more of the total number of the needle-shaped Mn—Si based compounds having the lengths of 50 μm or more in the major axis direction are segmented

TABLE 3

| TEST METHOD | BUSH TEST |
|---|---|
| BEARING INSIDE DIAMETER | 20 mm |
| PERIPHERAL SPEED | 12 m/s |
| LOAD | ACCUMULATED LOAD (3 MPa/10 min) |
| LUBRICATING OIL | ENGINE OIL |
| LUBRICATING OIL TEMPERATURE | 120° C. |

TABLE 4

| | MATERIAL | COMPONENTS (MASS %) | | | | | AVERAGE OF LONG DIAMETERS OF NEEDLE-SHAPED PARTICLES (μm) | VOLUME % OF NEEDLE-SHAPED PARTICLES (%) | RATIO OF THE NUMBER OF SEGMENTED NEEDLE-SHAPED PARTICLES (%) | RATIO OF THE NUMBER OF SMALL PARTICLES OF 45 μm OR LESS (%) | SEIZURE RESISTANCE (MPa) |
|---|---|---|---|---|---|---|---|---|---|---|---|
| | | Cu | Zn | Mn | Si | OTHERS | | | | | |
| EXAMPLES | A | BALANCE | 29.3 | 2.5 | 0.8 | — | 72.3 | 19.6 | 50 | 64 | 17 |
| | B | BALANCE | 30.9 | 2.8 | 0.9 | — | 79.9 | 21.3 | 89 | 67 | 18 |
| | C | BALANCE | 28.7 | 3.2 | 1.1 | — | 69.0 | 20.2 | 100 | 70 | 20 |
| | D | BALANCE | 20.3 | 1.5 | 0.6 | — | 59.2 | 3.1 | 100 | 100 | 21 |
| | E | BALANCE | 44.7 | 5.1 | 1.5 | — | 110.2 | 49.8 | 100 | 100 | 22 |
| | F | BALANCE | 31.2 | 3.1 | 0.9 | Al: 2.4%, Fe: 0.1%, Bi: 0.5 | 74.6 | 22.2 | 100 | 100 | 23 |
| COMPARATIVE EXAMPLES | A | BALANCE | 31.0 | 2.9 | 1.2 | — | 75.5 | 25.2 | 39 | 34 | 12 |
| | B | BALANCE | 32.1 | 1.8 | 0.6 | — | 58.6 | 6.3 | 11 | 8 | 10 |
| | C | BALANCE | 30.5 | 3.1 | 0.7 | — | 75.5 | 20.2 | 0 | 0 | 9 |
| | D | BALANCE | 36.0 | 5.5 | 1.8 | — | 120.2 | 53.0 | 0 | 0 | 8 |
| | E | BALANCE | 31.2 | 3.1 | 0.9 | Al: 2.4%, Fe: 0.1%, Bi: 0.5 | 73.2 | 19.8 | 0 | 0 | 8 | into a plurality of small particles. In contrast, in comparative example A, the needle-shaped Mn—Si based compounds are not segmented as in the conventional product. In the wear test, examples A and B have the wear resistance equivalent to the wear resistance of comparative example A as shown in Table 2.

Next, with respect to examples A to F, which used the copper-based slide members in which the needle-shaped Mn—Si based compounds are dispersed according to the present embodiment, and comparative examples A to E, a seizure test using a bearing test machine was performed. Table 3 shows the seizure test conditions. Examples A and B are the same as examples A and B which were subjected to the wear test, and comparative example C is the same as comparative example A which was subjected to the wear test. Table 4 shows the chemical compositions of examples A to F and comparative examples A to E, the parameters relating to the dispersion states of the needle-shaped Mn—Si based compounds and seizure resistance. "AVERAGE OF LONG DIAMETERS OF NEEDLE-SHAPED PARTICLES", "VOLUME % OF NEEDLE-SHAPED PARTICLES" AND "RATIO OF THE NUMBER OF SEGMENTED NEEDLE-SHAPED PARTICLES" are the same as described in the wear test. Further, "RATIO OF THE NUMBER OF SMALL PARTICLES OF 45 μm OR LESS" shows the measurement result of measuring the ratio of small particles having the lengths of 45 μm or less in the major axis direction with respect to the total number of small particles which constitute the needle-shaped Mn—Si based compounds having the lengths of 50 μm or more in the major axis direction within the measurement field of view. Further, "SEIZURE RESISTANCE" shows the average value of the maximum contact pressures without seizure.

In each of examples A to F and comparative example A to E, the lengths in the major axis direction of the needle-shaped Mn—Si based compounds are 50 μm or more, and 3 to 50 volume % of the needle-shaped Mn—Si based compounds having the lengths of 50 μm or more in the major axis direction is contained in the copper-based slide member, except for comparative example D. In each of examples A to F, 50% or more of the total number of the needle-shaped Mn—Si based compounds having the lengths of 50 μm or more in the major axis direction are segmented into a plurality of small particles. In contrast, in each of comparative examples A to E, the needle-shaped Mn—Si based compounds are not segmented as in the conventional product. In the seizure test, examples A to F have excellent seizure resistance as compared with comparative examples A to E as shown in Table 4.

Further, in each of examples A to F, as "RATIO OF THE NUMBER OF SEGMENTED NEEDLE-SHAPED PARTICLES" and "RATIO OF THE NUMBER OF SMALL PARTICLES OF 45 μm OR LESS" are higher, more excellent seizure resistance is obtained. More specifically, examples C to F, in which all of the needle-shaped Mn—Si based compounds having the lengths of 50 μm or more in the major axis direction are segmented into small particles, are excellent in seizure resistance as compared with examples A and B which contain the needle-shaped Mn—Si based compounds which are not segmented into a plurality of small particles. Further, examples C to F, in each of which 70% or more of the total number of small particles which constitute the needle-shaped Mn—Si based compounds having the lengths of 50 μm or more in the major axis direction are segmented into small particles having the lengths of 45 μm or less in the major axis direction, are excellent in seizure resistance as compared with examples A to B in each of which the ratio of the number of small particles having the lengths of 45 μm in the major axis direction is low. In particular, among examples C to F, examples D to F, in each of which all the total number of small particles which constitute the needle-shaped Mn—Si based compounds having the lengths of 50 μm or more in the major axis direction are segmented into small particles having the lengths of 45 μm or less in the major axis direction, are more excellent in seizure resistance as compared with example C containing small particles which are not segmented into particles having the lengths of 45 μm or less in the major axis direction.

Further, in example F, 2.4 mass % of Al, 0.1 mass % of Fe, and 0.5 mass % of Bi are added to the copper-based slide member, and example F is more excellent in seizure resistance than examples A to D to which these elements are not added. It is confirmed by an experiment that the same effect can be obtained by adding elements such as Ni, Sn, Cr, Ti, Mo, Co, Zr, Sb and Pb, other than the elements added to example F.

Further, in each of comparative examples A to E, as "RATIO OF THE NUMBER OF SEGMENTED NEEDLE-SHAPED PARTICLES" and "RATIO OF THE NUMBER OF SMALL PARTICLES OF 45 μm OR LESS" were lower, the seizure resistance became lower and scratches tended to be seen on the shaft and bearing surface after the seizure test. This is assumed to be caused due to increase of the frequency of falling off of the coarse needle-shaped Mn—Si based compounds which damage the shaft and bearing surface when the Mn—Si based compounds fall off during sliding.

Further, in comparative example E, 2.4 mass % of Al, 0.1 mass % of Fe, and 0.5 mass % of Bi are added to the copper-based slide member as in example F. However, the seizure resistance was not improved. It is confirmed by an experiment that even when elements such as Ni, Sn, Cr, Ti, Mo, Co, Zr, Sb and Pb are added other than the elements added to comparative example E, the seizure resistance is not improved.

From the above described result, it can be confirmed that the seizure resistance is excellent when the dispersion state of the needle-shaped Mn—Si based compounds is optimal, as in the case in which 50% or more of the total number of needle-shaped Mn—Si based compounds having the lengths of 50 μm or more in the major axis direction are configured by a plurality of small particles.

The invention claimed is:

1. A copper-based slide member comprising a brass in which Mn—Si based compounds are dispersed in a brass structure,
    wherein the Mn—Si based compounds contain particles of needle-shaped Mn—Si based compounds having lengths of 50 μm or more in a major axis direction, and 50% or more of a total number of the needle-shaped Mn—Si based compounds are constituted of a plurality of segmented particles.

2. The copper-based slide member according to claim 1, wherein all of the needle-shaped Mn—Si based compounds having the lengths of 50 μm or more in the major axis direction in the copper-based slide member are constituted of a plurality of segmented particles.

3. The copper-based slide member according to claim 1, wherein in 70% or more of the total number of the segmented particles which constitute the needle-shaped Mn—Si based compounds having the lengths of 50 μm or more in the major axis direction in the copper-based slide member, lengths of the segmented particles are 45 μm or less with respect to the major axis direction of the needle-shaped Mn—Si based compounds having the lengths of 50 μm or more in the major axis direction.

4. The copper-based slide member according to claim 1, wherein the copper-based slide member contains 3 volume % to 50 volume % of the needle-shaped Mn—Si based compounds having the lengths of 50 μm or more in the major axis direction.

5. The copper-based slide member according to claim 1, wherein the copper-based slide member is constituted of 20 mass % to 45 mass % of Zn, 0.3 mass % to 2.0 mass % of Si, and 1.0 mass % to 6.0 mass % of Mn, the balance being Cu and inevitable impurities.

6. The copper-based slide member according to claim 1, wherein the copper-based slide member further contains 0.1 mass % to 5 mass % in total of at least one element selected from the group consisting of Fe, Al, Ni, Sn, Cr, Ti, Mo, Co, Zr and Sb.

7. The copper-based slide member according to claim 1, wherein the copper-based slide member further contains 0.1 mass % to 5 mass % in total of at least one element selected from the group consisting of Pb and Bi.

* * * * *